Jan. 27, 1959   J. E. POORMAN   2,870,662
CROSS-SLIDE KNURLING OR LIKE TOOL
Filed March 19, 1956   2 Sheets-Sheet 1

INVENTOR
John E. Poorman.

BY
ATTORNEY

Jan. 27, 1959 J. E. POORMAN 2,870,662
CROSS-SLIDE KNURLING OR LIKE TOOL
Filed March 19, 1956 2 Sheets-Sheet 2

INVENTOR
John E. Poorman.
BY
ATTORNEY

United States Patent Office 2,870,662
Patented Jan. 27, 1959

2,870,662
CROSS-SLIDE KNURLING OR LIKE TOOL

John E. Poorman, Philadelphia, Pa., assignor to
J. E. Poorman, Inc., Philadelphia, Pa.

Application March 19, 1956, Serial No. 572,286

6 Claims. (Cl. 80—5.1)

This invention relates to knurling or like tools and more particularly to such tools that are adapted for use on a cross-slide of a lathe or like machines and especially with automatic multispindle machines.

It has heretofore been proposed to provide a knurling or like tool for working the cylindrical surfaces of a work piece and which tool comprises a pair of pivotally supported arms each carrying a tool or knurling wheel. For the most part, these tools have been capable of use only with single spindle lathes and have not been adapted for use on cross-slides in which the tool is reciprocated to and from the work. As a result, the knurling or tool wheels have not been properly centralized so that they are capable of use on cross-slides and particularly with automatic and multispindle machines. These prior art tools have largely involved manually positioning of the knurling wheels relative to the work.

Having in mind the defects of the prior art devices, it is the principal object of the present invention to provide a knurling or like tool adapted for use on cross-slides.

It is another object of the present invention to provide a knurling or like tool adapted for use with automatic multispindle machines.

It is still another object of the invention to provide a knurling or like tool having a pair of movably supported knurling or tool wheels which are capable of self-centering with respect to the work.

It is a further object of the invention to provide a knurling or like tool having a pair of movably supported knurling or tool wheels and including means for equalizing the pressure on the wheels on the work surfaces.

It is a still further object of the invention to provide a knurling or like tool having simplicity of design, economy of construction and efficiency in operation.

Briefly, a knurling or like tool in accordance with the present invention comprises a stock adapted for mounting upon a cross-slide of a lathe or like machine and having an upstanding support at one end and on which are pivoted a pair of levers, one above the other, and preferably intermediate the length thereof. Each of the levers at their outer end rotatably supports a knurling or tool wheel and spaced from the wheel, preferably at its inner end, one of the levers, normally the upper lever, is provided with an internally threaded bore carrying an adjustment screw adapted for engagement with the other of the levers to center the knurling or tool wheels relative to the work and to equalize the pressure of the wheels on the work. Each of the levers preferably is bifurcated at its outer end to accommodate the knurling wheel and the furcations or arms extend laterally and engage the forward surface of the stock support to position the wheels in proper work engaging relation when the tool is out of engagement with the work and also to assure proper abutment between the adjustment screw and the companion lever.

The novel features that are considered characteristic of the invention are set forth with particularity in the appended claims. The invention itself, however both as to its organization and its method of operation, together with additional objects and advantages thereof, will best be understood from the following description of a specific embodiment when read in connection with the accompanying drawings, wherein like reference characters indicate like parts throughout the several figures and in which:

Figure 5:
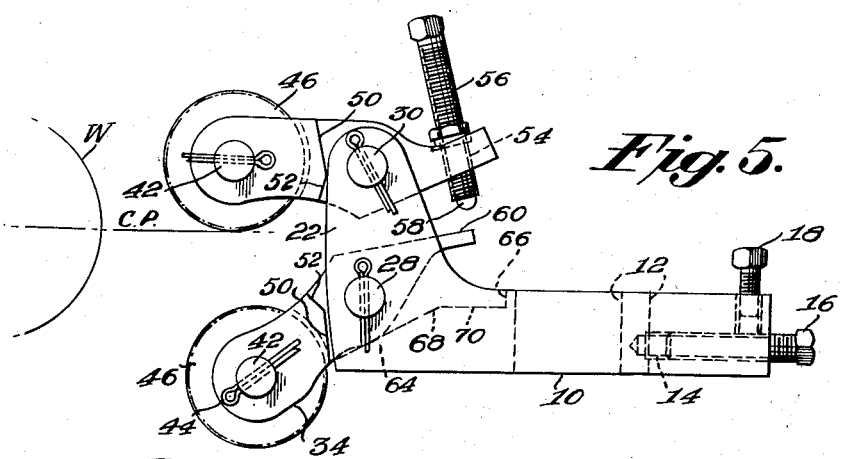
Figure 6:
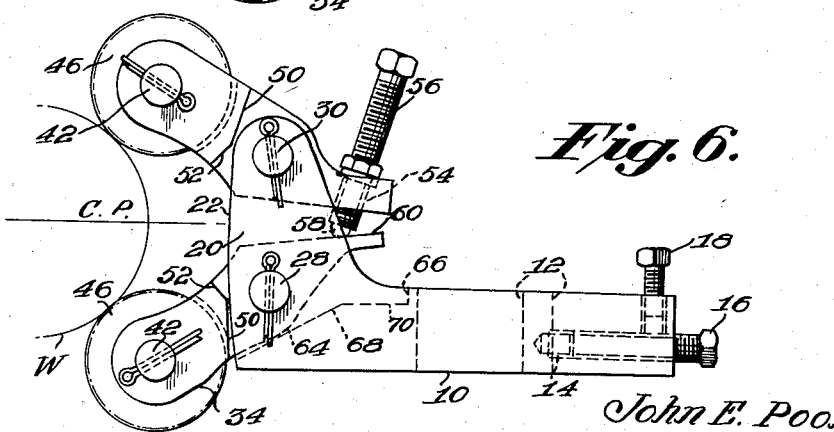

Fig. 5 is a side view in elevation of the tool with the knurling wheel carriers at an intermediate adjustment and in retracted or relaxed position out of engagement with the work, and Fig. 6 is a side view in elevation of the tool adjusted as shown in Fig. 5 but advanced to operative position with the knurling wheels in engagement with the work and illustrating the manner in which the knurling wheels are self-centering relative to the work.

Figure 1:
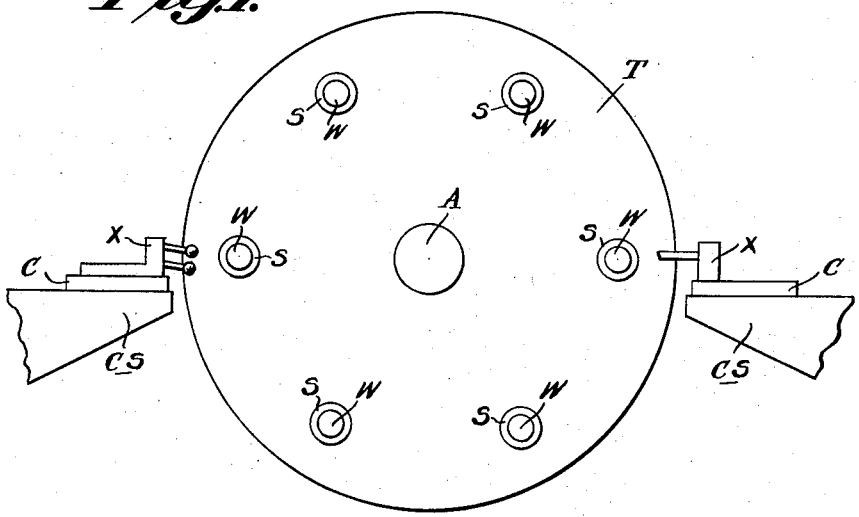
Fig. 1 is a diagrammatic view in elevation of a multispindle machine showing the relative relationship between a tool supported on a cross-slide and the spindle carrying turret of an automatic multispindle machine.

Referring to the drawings in detail, specifically to Fig. 1, a tool according to the present invention is specifically adapted for use on an automatic multispindle machine of well known type and which includes a turret T usually rotatable on a horizontal axis A and carrying a plurality of spindles S each adapted to rotatably support a work piece W. Adjacent the turret T and more or less radially therefrom are positioned one or more cross-slides CS each supporting a reciprocal carriage C adapted to support a tool X. It is common practice to have a plurality of the cross-slides CS arranged so that different kinds of tools X can simultaneously operate on different work pieces W.

In operation, the turret T is indexed by a step-by-step movement to successively present different work pieces W to the tools X, the tools being retracted on the carriages C from the work pieces during the indexing movement of the turret T and then advanced into engagement with the work pieces W when the indexing movement of the turret T is stopped. From the foregoing description, it will be apparent that any tool comprising movably supported tool rollers or wheels, such as knurling wheels, for engagement with and working on the work pieces must be capable of self-centering with respect to the work pieces when the carriages are advanced toward the spindles so as to engage the tool wheels with the work pieces.

Figure 2:
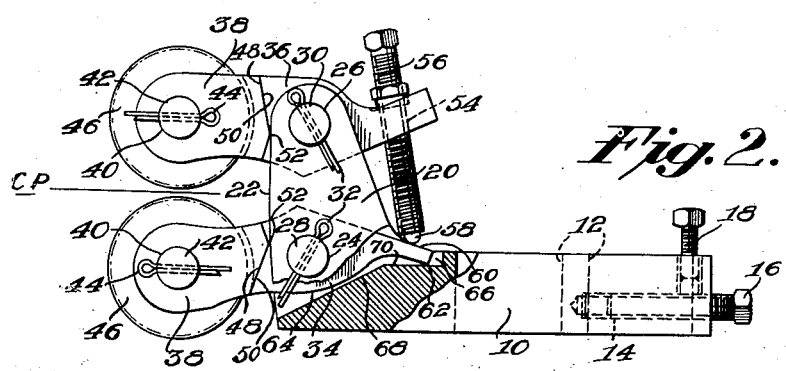
Fig. 2 is a side view in elevation of a knurling tool in accordance with the present invention and showing knurling wheels at their minimum spacing, a portion of the tool holder being broken away to clarify the disclosure.
Figure 3:
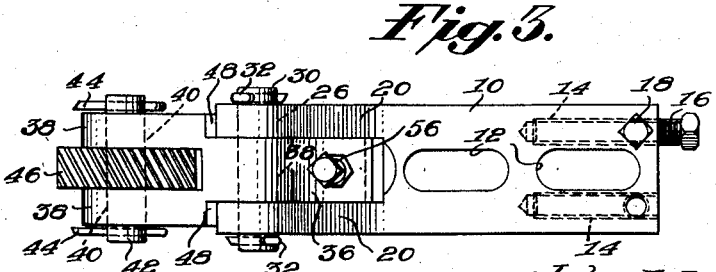
Fig. 3 is a top plan view of the tool shown in Fig. 2.

A tool in accordance with the present invention and embodying the foregoing concept, as best shown in Figs. 2 and 3, comprises a stock 10 having slots 12 vertically therethrough for the passage of bolts for adjustably positioning the stock on a cross-slide carriage. The stock 10 is provided at its rear end with a plurality of threaded bores 14 for receiving one or more adjustment screws 16 for abutting the carriage, and a set screw 18 perpendicular to and engageable with the adjustment screw 16 for locking the latter in adjusted position. At its forward end, the stock 10 is provided with an upstanding support preferably in the form of a pair of parallel spaced ears 20 having front abutment surfaces 22. The ears 20 are each provided with vertically spaced and axially aligned bores or apertures 24 and 26 for receiving crosspins 28 and 30, respectively, these cross-pins preferably being removably retained in the ears, as by cotter pins 32 through each end thereof.

A pair of levers 34 and 36 are provided, preferably intermediate their lengths, with transverse bores 88 by means of which they are respectively journaled on the cross-pins 28 and 30 between the ears 20. At their forward ends, the levers 34 and 36 extend beyond the abutment faces 22 of the ears 20 and at these ends, the levers preferably are bifurcated to provide each of the levers with a pair of spaced arms 38 which have cylindrical bores 40 therethrough with the bores of each pair of arms in axial alignment. A cross-pin 42 is mounted in the bores 40 of each pair of arms 38 and preferably is removably retained in position by suitable fasteners such as cotter pins 44 through each end thereof. A tool wheel 46, such as a knurling wheel, is journaled on each of the cross-pins 42 between each pair of arms 38.

An important characteristic of the invention resides in the provision of abutment means for limiting the swinging of the levers 34 and 36 so as to prevent the movement of the tool wheels 46 beyond the center-plane diametrically intersecting the axis of the work piece. This center-plane is identified CP in the drawings and perpendicularly intersects, midway between the axes of the lever journal cross-pins 28 and 30, a plane common to the axes of said cross-pins 28 and 30. Conveniently, one of the abutments may be constituted by the arms 38 which extend laterally beyond the sides of the levers 34 and 36 with the rear ends 48 of the arms extending in confronting relation to the abutment surfaces 22 of the ears 20. The rear ends 48, in side elevation, are preferably V-shaped, the longer side 50 of the V providing clearance for swinging of the tool wheels from each other and the apex 52 forming an abutment for engagement with the surfaces 22 of the ears 20.

At its opposite or rear end, the upper lever 36 is provided with a threaded bore 54 extending therethrough from top to bottom and in which is threaded an adjustment screw 56 having a rounded lower abutment end 58 for engaging and bearing upon an upper abutment surface 60 on the rear end of the lower lever 34. On its underside, the lower lever 34 is provided with a lower abutment preferably constituted by the lower rear corner 62, and an intermediate abutment surface 64 midway of its length. Between the ears 20, the stock 10 is provided with an abutment, preferably constituted by a recess 66 which at its forward portion has an inclined abutment surface 68 sloping downwardly to the front of the stock for cooperation with the intermediate abutment 64, and a substantially horizontal surface 70 for cooperation with the lower abutment 62.

In operation, when the tool is advanced into engagement with the work W, the upper tool wheel 46 engages the work and is swung upwardly thereby, whereupon the abutment end 58 of the adjustment screw 56 abuts the upper abutment 60 of the lower lever 34 and swings the lever 34 to bring the lower tool wheel 46 up into engagement with the work with the two wheel axes disposed in a substantially vertical plane and equispaced above and below the center-plane CP which passes diametrically through the axis of the work. By this arrangement, the tool wheels 46 always engage the work uniformly and apply an equal pressure thereon regardless of the spacing of said tool wheels 46 as regulated by the adjustment screw 56.

Figure 4:
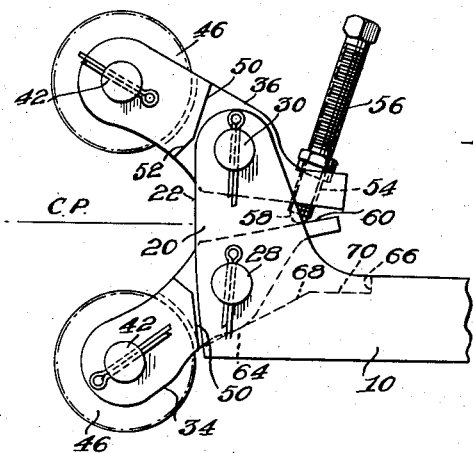
Fig. 4 is a side view in elevation showing the tool of the present invention with the knurling wheels operatively positioned and at maximum spacing.

The foregoing function is illustrated more clearly in Figs. 2 and 4 wherein it will be seen in Fig. 2 that the screw 56 is adjusted practically to its maximum length through the bore 54 and toward the lower lever 34 so that the tool wheels 46 are closely juxtaposed immediately above and below the center-plane CP. In contrast, in Fig. 4, the screw 56 is retracted through the bore 54 to practically its minimum length toward the lower lever 34 so that the wheels 46 are widely spaced but are still equidistance above and below the center-plane CP. These two figures illustrate the tool wheels 46 in their minimum and maximum operational spacing.

It will be noted in Fig. 2 that the rear abutment 62 of the lower lever 34 is engaged with the horizontal abutment surface 70 of the stock recess 66 to limit the upward movement of the lower tool wheel 46 so that this wheel cannot pass upward beyond the center-plane CP. The apex 52 of the rear ends of the arms 38 of the lower lever may or need not simultaneously engage the front surfaces 22 of the ears 20. In contrast, as shown in Fig. 4, the intermediate abutment 64 of the lever 34 is resting on the inclined surface 68 of the stock recess 66 to limit the lower movement of the lower tool wheel 46 and elevate the upper abutment surface 60 of the lever 34 for engagement with the abutment end 58 of the adjustment screw 56 to thereby limit the elevation of the upper tool wheel 46 so as to apply an equal pressure to the work W by both of said wheels.

More importantly, and a critical part of the invention, resides in the fact that the upper lever 36 is also arranged so that its tool wheel 46 cannot pass below the center-plane CP and this is accomplished by the arrangement of the abutment surfaces or apexes 52 on the rear ends 48 of the arms 38 in cooperation with the abutment surfaces 22 on the forward edges of the ears 20. Thus, the upper tool wheel 46 cannot gravitate or swing below the center-plane CP which would foul the work when the tool is advanced on a cross-slide. Moreover, neither of the tool wheels can pass beyond their respective sides of the center-plane CP and, therefore, cannot abut or foul each other.

The foregoing arrangement is best illustrated in Figs. 5 and 6 wherein the adjustment screw 56 is shown in an intermediate position and the tool is shown in Fig. 5 in a retracted position with the levers 34 and 36 gravitated to their lower positions, while in Fig. 6, the tool is shown in advanced position with the tool wheels 46 in engagement with the work W. Referring to Fig. 5, it will be seen that the weight of the wheels 46 and forward ends of the levers has swung the lower lever 34 downwardly until its intermediate abutment 64 has engaged the inclined surface 36 of the stock 10 while the upper lever 36 has gravitated downwardly until the abutment 52 has engaged the abutment surfaces 22 of the ears 20. In this position, the abutment end 58 of the screw 56 is elevated above the upper abutment surface 60 of the lower lever 34 but the upper tool wheel 46 is disposed above the center-plane CP.

Upon advancement of the tool into engagement with the work W, as shown in Fig. 6, the upper tool wheel 46 engages the work W and thereby swings the lever 36 upwardly until the abutment end 58 of the screw 56 bears on the abutment 60 and depresses the rear end of the lower lever 34 and thereby swings the lever 34 to bring the lower tool wheel 46 upwardly into engagement with the work W, the screw 56 maintaining the levers 34 and 36 in position with their respective tool wheels 46 in uniform relation with respect to the work W and applying equalized pressures on the work equidistance above and below the center-plane CP. By this arrangement, the tool wheels are never permitted to pass beyond their respective sides of the center-plane so that they never foul the work and are capable of retraction and advancement from and toward the work in automatic machines.

Although a certain specific embodiment of the invention has been shown and described, it is obvious that many modifications thereof are possible. The invention, therefore, is not to be restricted except insofar as is necessitated by the prior art and by the spirit of the appended claims.

That which is claimed as new is:

1. A knurling or like tool of the type having a pair of movably supported tool wheels such as knurling wheels, comprising a rigid stock for mounting on a machine, a pair of pivots carried by said stock in fixed spaced relation one above the other and having substantially parallel axes, a lever pivotally supported intermediate its ends by each of said pivots, a tool wheel journaled on the corresponding end of each of said levers, abutment means on the upper of said levers and engageable with said stock to limit gravitation of the tool wheel carried thereby to prevent movement of said tool wheel below a center-plane perpendicularly intersecting midway between said axes a plane common to said axes, and mutually cooperative adjustable abutment means carried by said levers on the ends opposite said wheels for swinging the lower of said levers to elevate its tool wheel and equalize the spacing of said wheels relative to said center-plane when said wheels engage a workpiece, said mutually cooperative adjustable abutment including an abutment surface on one of said levers and an abutment screw carried by the other of said levers and engageable with said abutment surface.

2. A tool as set forth in claim 1 comprising abutment means on the lower of said levers and cooperative with said stock to limit upward movement of the lower tool wheel and prevent passage of said wheel beyond said center-plane.

3. A tool as set forth in claim 2 comprising abutment means on said lower lever and stock for limiting swinging of said lever and prevent passage of said abutment surface beyond mutually engageable relation with said abutment screw.

4. A knurling or like tool of the type having a pair of movably supported tool wheels such as knurling wheels, comprising a stock for mounting on the cross-slide of a machine, an upstanding support at one end of said stock and rigid therewith, a pair of pivots carried by said support in substantially vertically spaced relation and having substantially parallel axes, a lever pivotally supported intermediate its ends by each of said pivots, a tool wheel journaled on each of said levers at the corresponding ends of said levers and beyond said stock and support, an abutment surface on said support, an abutment on the upper of said levers and engageable with said abutment surface to prevent gravitation of the tool wheel carried by said upper lever below the center-plane perpendicularly intersecting midway between said pivot axes a plane common to said axes, said tool wheels being journaled on substantially parallel axes which are spaced substantially equidistant from their respective pivot axes, and mutually cooperative adjustable abutment means on the ends of said levers opposite said tool wheels for maintaining said wheels equidistant from said center-plane when they are in operative position in engagement with a workpiece, said mutually cooperative adjustable abutment means including an abutment surface on the upper side of the lower lever and an abutment screw threaded through said upper lever and engageable with said abutment surface.

5. A knurling or like tool of the type having a pair of movably supported tool wheels such as knurling wheels, comprising a stock for mounting on the cross-slide of a machine, a pair of upstanding ears at one end of said stock, a pair of vertically spaced bores in each of said ears with the corresponding bores in said ears being axially aligned on substantially parallel axes, a cross-pin mounted in each pair of corresponding bores and spanning said ears, means removably retaining said cross-pins in said ears, a lever journaled intermediate its ends on each of said cross-pins with corresponding ends of said levers extending beyond said ears and overlying said stock respectively, the forward ends of said levers beyond said ears being bifurcated and having a pair of laterally spaced parallel arms, each of said pair of arms having axially aligned bores therethrough with the axes of each pair of arm bores parallel to each other and the lever journal axes and equispaced from their respective lever journal axes, cross-pins mounted in said arm bores and respectively spanning each pair of arms, means removably retaining said cross-pins in the respective pair of arms, a tool wheel pivotally supported by each cross-pin between the respective pair of arms, the upper lever having an internally threaded bore at its rear end with said bore opening through the upper and lower surfaces of said lever, an adjustment screw threaded in said bore and having a lower abutment end, the lower lever having at its rear end an upper abutment surface and a lower abutment surface and midway of its length on its lower side an intermediate abutment surface, said upper abutment surface cooperating with the abutment end of said screw to maintain said tool wheels, when in operative position, equispaced from a center-plane perpendicularly intersecting midway between the lever journal axes a plane common to said axes, said stock having an abutment portion between said ears and including a horizontal portion spaced from the forward end thereof and an inclined portion sloping downwardly from said horizontal portion to the front of said ears, said horizontal portion cooperating with the lower abutment surface of said lower lever to prevent swinging of the lower tool wheel above said center-plane, said inclined portion cooperating with said intermediate abutment surface to prevent swinging of said upper abutment surface beyond the path of the abutment end of said screw, said pairs of arms extending laterally beyond the sides of said levers with the rear ends of said arms extending laterally and confronting said ears, said arm rear ends including recessed portions to avoid engagement with said ears and permit swinging of said tool wheels from said center-plane and abutment portions engageable with said ears to prevent movement of said tool wheels beyond their respective sides of said center-plane.

6. A knurling or like tool of the type having a pair of movably supported tool wheels such as knurling wheels and especially adapted for use on cross-slides of automatic multispindle tool machines, comprising a pair of levers, a tool wheel journaled on one end of each of said levers, mutually engageable rigid abutment means on the opposite ends of said levers, the abutment means on one of said levers being adjustable, a rigid stock for mounting on a machine, means pivotally mounting said levers intermediate their ends one above the other on said stock for pivotal movement about substantially parallel horizontal axes which are in fixed relation relative to each other and to said stock with said abutment means of said levers mutually cooperative upon mutual engagement to maintain said tool wheels equispaced on opposite sides of a center-plane perpendicularly intersecting midway between said axes a plane common to said axes when said tool wheels are in engagement with a workpiece, and abutment means on the upper of said levers and engageable with said stock to limit gravitation of the tool wheel carried thereby to prevent movement of said tool wheel below said center-plane to preclude fouling a workpiece upon engagement by said tool wheels.

References Cited in the file of this patent

UNITED STATES PATENTS

| | | |
|---|---|---|
| 632,358 | Miller | Sept. 5, 1899 |
| 1,044,006 | Boche | Nov. 12, 1912 |
| 1,112,662 | Schley | Oct. 6, 1914 |
| 2,294,685 | Nelson | Sept. 1, 1942 |
| 2,546,058 | Boulet | Mar. 20, 1951 |
| 2,711,131 | Smith | June 21, 1955 |
| 2,771,807 | Trinkle | Nov. 27, 1956 |

FOREIGN PATENTS

| | | |
|---|---|---|
| 480,973 | Canada | Feb. 12, 1952 |